United States Patent

[11] 3,547,055

[72] Inventor Auram B. Zanft
New York, N.Y.
[21] Appl. No. 759,481
[22] Filed Sept. 12, 1968
[45] Patented Dec. 15, 1970
[73] Assignee Hagan Industries, Incorporated
Corona, N.Y.
a corporation of New York

[54] INCINERATOR
28 Claims, 4 Drawing Figs.
[52] U.S. Cl. .................................................. 110/8,
110/119
[51] Int. Cl. ..................................................... F23g 5/00
[50] Field of Search .......................................... 55/236,
237, 238; 110/7, 8, 18, 119

[56] References Cited
UNITED STATES PATENTS
1,886,548 11/1932 Horne et al. .................. 55/238
2,696,275 12/1954 Pring ............................ 55/238
3,104,961 9/1963 Westlin ......................... 55/237
3,323,475 6/1967 Melgaard ...................... 110/8
3,420,195 1/1969 Kalika .......................... 110/119X Primary Examiner—Kenneth W. Sprague
Attorney—Mason, Fenwick & Lawrence ABSTRACT: An incinerator including a housing structure having a combustion chamber, a settling chamber a first passageway intercommunicating the combustion and settling chambers, a plurality of cylindrical chambers each having axially spaced inlet and outlet openings, a second passageway intercommunicating the settling chamber and the inlets of the cylindrical chambers, a flue, a third passageway intercommunicating the outlets of the cylindrical chambers and the flue and means for injecting a fluid axially through the cylindrical chambers whereby combustion gases laden with entrained solid particles emanating from the combustion chamber and flowing through the first passageway, the settling chamber and the second passageway will traverse through the cylindrical chambers with a swirling motion and the entrained solid particles will contact the fluid injected into the cylindrical chambers and separate from the main stream of combustion gases.

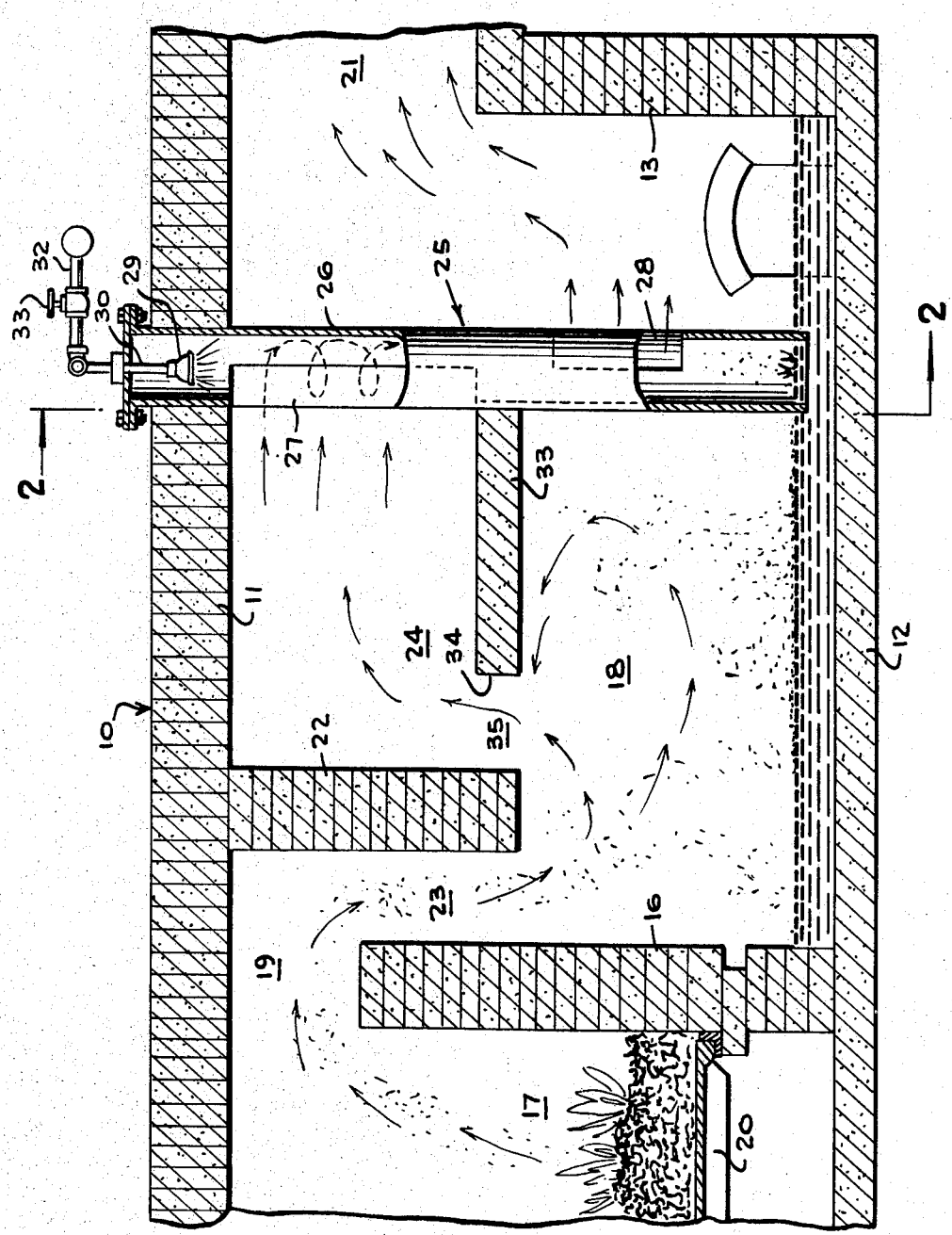

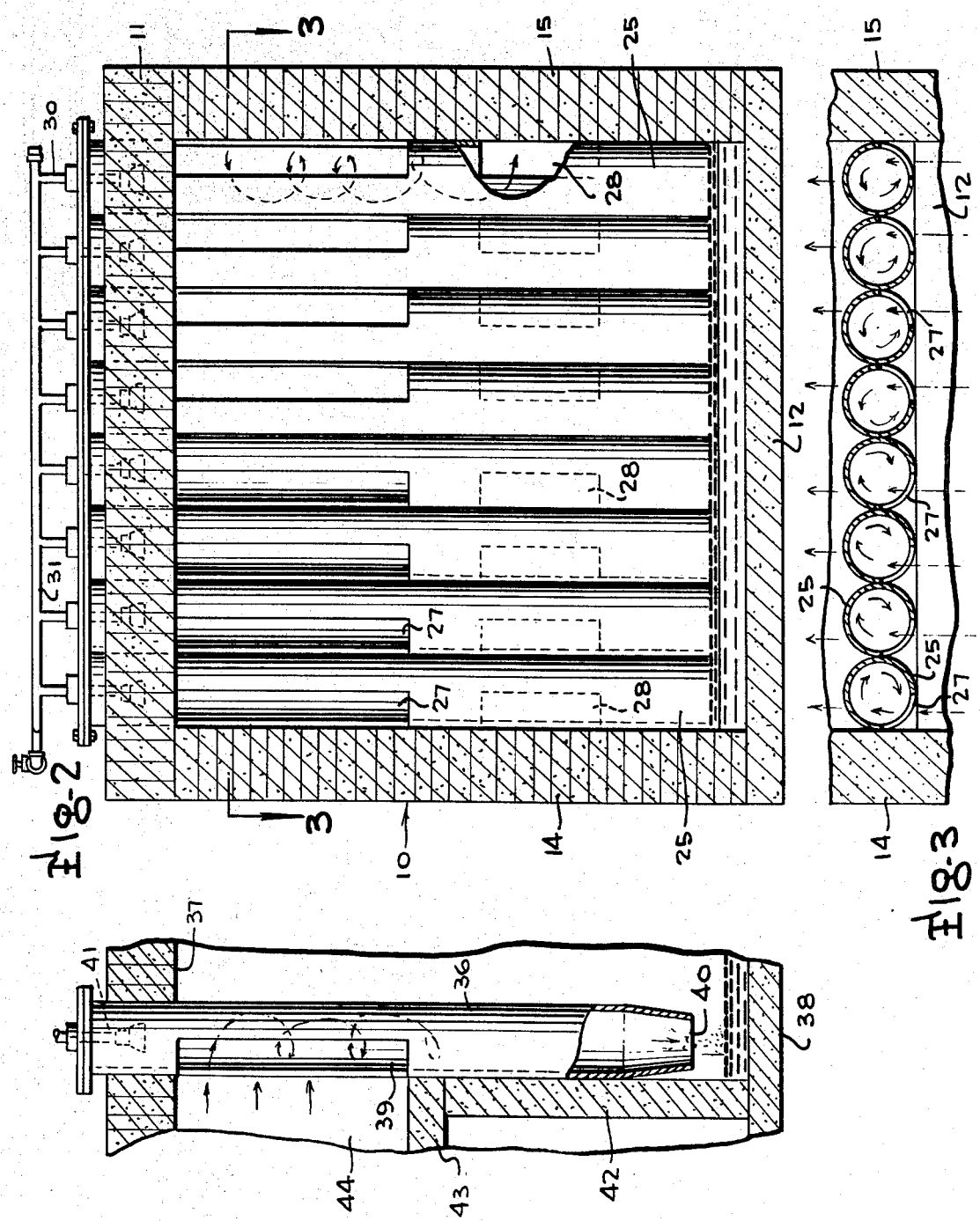

INCINERATOR

This invention relates to an incinerator, and more particularly to an incinerator having novel structure for separating fly ash from the combustion gases thereof prior to such gases being discharged into the atmosphere.

In most conventional, large capacity incinerators of the type commonly used in commercial, industrial and municipal incinerators, the burning of refuse usually results in the production of a considerable amount of fly ash which is carried off by the combustion gases. Normally, this fly ash is carried by the combustion gases through the flue of the incinerator and discharged into the atmosphere, causing undesirable pollution of the air.

There have been various different types of devices developed and utilized in incinerators to remove fly ash from the combustion gases prior to the gases being discharged into the atmosphere. Many of such devices have included power-consuming devices which have been found to be undesirable from the standpoint of performance and cost of operation and maintenance. Accordingly, it has been desirable to develop a large capacity incinerator having suitable means for effectively and economically removing fly ash from the gases emanating from the combustion chamber.

It is, therefore, the principal object of this invention to provide an improved incinerator.

Another object of the present invention is to provide an improved incinerator adapted to remove fly ash from gases emanating from the combustion chamber of the incinerator, effectively and economically.

A further object of the present invention is to provide an improved incinerator having a large capacity suitable for commercial, industrial and municipal installations, which is adapted to remove fly ash from the combustion gases both effectively and economically.

A still further object of the present invention is to provide an improved incinerator adapted to extract gaseous acids and/or alkali from the gases emanating from the combustion chamber of the incinerator.

Another object of the present invention is to provide an improved incinerator adapted to reduce the temperature of the gases emanating from the combustion chamber, thereby protecting the draft-producing means of the incinerator from damage.

A further object of the present invention is to provide an improved incinerator having a large capacity suitable for commercial, industrial and municipal purposes, which is adapted to remove fly ash from the combustion gases, extract gaseous acids and/or alkali from the gases and reduce the temperature of the gases, thereby protecting the draft-producing means of the incinerator from damage, both effectively and economically.

A still further object of the present invention is to provide an improved incinerator which will produce a minimum of pollution of the atmosphere relative to comparable conventional incinerators.

Another object of the present invention is to provide an improved incinerator effective in removing fly ash from the combustion gases produced thereby, which is comparatively inexpensive to construct and economical to operate.

A further object of the present invention is to provide an improved incinerator having novel structure for separating fly ash from the combustion gases thereof before the gases are discharged through the flue of the incinerator into the atmosphere.

A still further object of the present invention is to provide an improved large capacity incinerator suitable for use in commercial, industrial and municipal installations, having novel structure for separating fly ash from the combustion gases thereof, extracting gaseous acids and/or alkali from such gases, and reducing the temperature of such gases, thereby protecting the draft-producing means of the incinerator from damage, which is comparatively simple in structure, inexpensive to construct and economical to operate.

Other objects and advantages of the present invention will become more apparent to those persons skilled in the art, from the following description taken in conjunction with the accompanying drawings, wherein:

FIG. 1 is a vertical cross-sectional view of an embodiment of the invention having portions thereof broken away;

FIG. 2 is a cross-sectional view taken along line 2-2 in FIG. 1;

FIG. 3 is a cross-sectional view taken along line 3-3 in FIG. 2; and

FIG. 4 is a vertical cross-sectional view of a modification of the embodiment of FIGS. 1 through 3.

Briefly described, the present invention relates to an incinerator generally including a housing structure having a combustion chamber, a settling chamber, a first passageway intercommunicating the combustion and settling chamber, a plurality of cylindrical chambers each having axially spaced inlet and outlet openings, a second passageway intercommunicating the settling chamber and the inlets of the cylindrical chambers, a flue, a third passageway intercommunicating the outlets of the cylindrical chambers and the flue, and means for injecting a fluid axially through the chambers whereby combustion gases laden with entrained solid particles emanating from the combustion chamber and flowing through the first passageway, the settling chamber and the second passageway, will traverse through the cylindrical chambers and the entrained solid particles will contact the fluid injected into the cylindrical chambers and separate from the mainstream of combustion gases. In addition, the fluid, preferably water, in the cylindrical chambers will extract a certain amount of gaseous acids and/or alkali and will reduce the temperature of the gases which are intended to pass in contact with certain draft-producing means and discharge into the atmosphere.

In the preferred embodiment of the invention, the cylindrical chambers are disposed vertically, the inlet and outlet openings of each cylindrical chamber are offset relative to the vertical axis of the chamber to permit the combustion gases to enter and be discharged tangentially, and the first and second passageways communicating with the settling chamber, preceding the cylindrical chambers, are disposed relative to each other whereby combustion gases passing through the settling chamber describe a curved path about a center of curvature disposed between such passageways, and the outlet passageway is provided with an inlet disposed sufficiently adjacent the center of curvature of the path of gases passing through the settling chamber, whereby solid particles entrained in the combustion gases passing through the settling chamber migrate along involute paths under the influence of centrifugal forces resulting from the motion of the combustion gases, and provide a first stage separation of fly ash particles from the mainstream of gases emanating from the combustion chamber.

Referring to the drawings, there is illustrated a preferred embodiment of the invention. The embodiment includes an incinerator 10 having a top wall 11, a bottom wall 12, a front wall (not shown), a rear wall 13, and side walls 14 and 15. Disposed within the incinerator is a partition wall 16 which is spaced from the front end wall and the rear end wall 13, providing a combustion chamber 17 and a settling chamber 18. The upper end of the partition wall 16 terminates below the lower side of the upper wall 11, to provide a horizontal passageway 19. The front end wall 13 is provided with a charging chute (not shown) communicating with the combustion chamber 17 through which refuse may be discharged into the combustion chamber. The refuse is charged onto a grate 20, which is mounted in the lower end of the combustion chamber, spaced from the lower wall 12. The rear end wall 13 is provided with a horizontal extending flue section 21.

Depending from the upper wall 11 and extending into the settling chamber 18 is a curtain wall 22. The lower end of the curtain wall projects below the upper level of the partition wall 16 and is spaced from the lower wall 12. In addition, the curtain wall 22 is spaced from the partition wall 16 and the rear end wall 13 to provide a first vertical passageway 23 and a second vertical passageway 24. As best illustrated in FIG. 1, the vertical passageway 23 intercommunicates the horizontal passageway 19 and the settling chamber 18, and the vertical passageway 24 communicates at its lower end with the settling chamber 18. It thus will be seen that combustion gases emanating from the burning refuse on the grate 20 in the combustion chamber will rise and pass through the horizontal passageway 19, downwardly through the vertical passageway 23, around the lower end of the curtain wall 22 in the settling chamber 18, describing a curved path, and upwardly through vertical passageway 24.

Spaced from the rear end wall 13 and the curtain wall 22 in the settling chamber, is a vertical partition wall 25 comprising a plurality of vertical cylindrical conduits 26 disposed in side by side relation across the width of the settling chamber. As best illustrated in FIGS. 1 and 2, the conduits 26 are mounted in the upper wall 11 and the lower ends thereof are spaced from the lower wall 12 of the incinerator. The upper ends of each of conduits 26 are provided with elongated openings 27 which are offset relative to the vertical axes of the conduits, communicate with the combustion chamber side of the settling chamber, and permit the entry of combustion gases tangentially into the vertical cylindrical chambers of the conduits. The lower ends of the conduits 26 are provided with outlet openings 28 which are axially spaced relative to the inlet openings 27, and which communicate with the flue side of the settling chamber. The openings 28 also are offset relative to the vertical axes of the conduits, so that gases traversing through the cylindrical chambers of the conduits will be ejected therefrom tangentially. It will be noted that gases traversing through the settling chamber will be caused to enter the inlet openings 27 of the conduits tangentially, will be caused to traverse the lengths of the conduits in a helical or swirling motion, and be ejected through the outlet openings 28 into the flue side of the settling chamber wherefrom they pass into the flue 21.

Mounted in the upper end of each conduit 26 is a sprinkler or spray unit 29 which is adapted to spray or sprinkle water downwardly along the sides of the interior chambers of the conduits 26. Each of the spray units 29 is connected by means of a line 30 by means of a manifold line 31, as best illustrated in FIG. 2, to a fluid supply line 32 having a shutoff valve 33. Preferably, each of the lines 30 is provided with a shutoff valve, so that selected spray units may be placed into or removed from service as desired. Water discharged through the lower ends of the conduits 26 settles in the lower end of the combustion chamber which serves as a trough. Water from the trough may be returned to the line 32 for recirculation through the system. Additional means are provided for adding fresh makeup water to the sprinkler system and to drain the lower end of the settling chamber for repairs or routine maintenance. It will be appreciated that the level of the water in the lower end of the settling chamber is maintained above the lower ends of the conduits 26 to cause all of the combustion gases traversing through the settling chamber to pass through the cylindrical chambers of the conduits 26.

Mounted in the vertical passageway 24 is a baffle member 33 having a front end 34 spaced from the curtain wall 22 to provide a restricted passageway 35 between the baffle member and the curtain wall. The lower end of the baffle member 33 is elevated relative to the lower end of the curtain wall 22, and the cross-sectional areas of the vertical passageway 23 and the restricted passageway 35 are substantially equal, in the preferred construction of the invention.

In the operation of the embodiment illustrated in FIGS. 1 through 3, when refuse is burned in the combustion chamber 17, the combustion gases emanating from the combustion chamber carry a certain amount of fly ash through passageways 19 and 23 into the settling chamber 18. The motion of gases flowing around the lower end of the curtain wall 22 in the settling chamber 18 produces centrifugal forces, causing a portion of the fly ash particles in the gas stream to follow involute paths of increasing radii from the center of curvature located at the lower end of the curtain wall. As a result of the fly ash particles migrating along involute paths, caused by centrifugal forces, gases having a smaller portion of fly ash entrained therein will follow curved paths of small radii, through the restricted passageway 35 and vertical passageway 24, and enter through tangential openings 27 into the interiors of conduits 26. The gases entering the conduits 26 will be laden with fly ash of a smaller particle size relative to the fly ash separated by centrifugal forces in the combustion chamber side of the settling chamber, and will traverse through the conduits 26 in a helical or swirling motion. As the gases traverse through the conduits 26 in a helical or swirling motion to be ejected through the outlet openings 28, they will contact the stream of water injected into the conduits by the spray units 29. The contact of such gases with the stream of water will cause the fine fly ash particles to become separated from the combustion gases and be carried by the water into the trough at the lower end of the settling chamber. The combustion gases relatively free of all fly ash particles, will be ejected through the outlet openings 28 of the conduits 26 into the flue side of the settling chamber and will pass through the flue 21 and be discharged into the atmosphere. It will be seen that the heavier fly ash particles will be separated from the main stream of combustion gases by gravitational and centrifugal forces as they flow around the lower end of the curtain wall 22, and the finer fly ash particles will be removed by contact with the stream of water as the gases traverse the conduits 26.

The heavier fly ash particles separated from the mainstream of combustion gases as such gases pass around the lower end of the curtain wall 22, will follow involute paths of increased radii and will impinge upon the lower side of the baffle member 33, causing them to precipitate and fall to the lower end of the settling chamber into the water trough. The fly ash accumulated in the water trough can be removed by any suitable means. In addition, any high-pressure zones developed below the baffle member 33 may be eliminated by providing relief passageways interconnecting the high-pressure zones with the flue side of the settling chamber or the vertical passageway 24 below the inlet openings 27 of the conduits 26.

FIG. 4 illustrates a modification of the partition wall in the settling chamber utilized for removing fine fly ash particles from the combustion gases emanating from the combustion chamber. This modification includes a plurality of conduits 36 which depend from the upper wall 37 of the incinerator in the settling chamber. As illustrated, the lower ends of the conduits are spaced from the lower wall 38 of the settling chamber. The upper ends of the conduits 36 are provided with offset inlet openings 39 which are similar to the inlet openings 27 described in connection with the previous embodiment and which communicate with the combustion chamber side of the settling chamber. The lower ends of the conduits 36 are open, providing outlet openings 40 communicating with the flue side of the settling chamber. As illustrated in FIG. 4, combustion gases entering tangentially through inlet openings 39 will traverse axially through the conduits 26, following a helical or swirling motion, and be ejected axially through the lower outlet openings 40.

Each of the conduits 36 is provided with a sprinkler or spray unit 41 which is similar in construction and operation to the sprinkler or spray units 29 mentioned in connection with the previous embodiment. The outlet openings of the conduits 36 are sealed from the combustion chamber side of the settling chamber by a partition wall 42 which is disposed transversely and between the baffle member 43 in the vertical passageway 44 and the lower wall 38 of the incinerator. With such an arrangement, water discharged through the outlet openings 40 of the conduits 36 will settle on the flue side of the settling chamber and can be recirculated therefrom through the sprinkler or spray system similar to the previously mentioned embodiment.

The embodiment of the invention utilizing the modification illustrated in FIG. 4 will operate similar to the embodiment illustrated in FIGS. 1 through 3 except that combustion gases traversing through the conduits 36 will be ejected axially through the lower ends of the outlet openings 40 into the flue side of the settling chamber. The embodiment in all other respects will function similar to the embodiment illustrated in FIGS. 1 through 3.

Additional embodiments of the invention would include a plurality of banks of conduits 26 or 36, a combination of banks of conduits 26 and 36. Such constructions would provide a greater reduction of fly ash particles in the combustion gases prior to discharging the gases through the flue of the incinerator into the atmosphere.

I claim:

1. An incinerator comprising a combustion chamber, a flue, a settling chamber, said settling chamber having an inlet passageway communicating with said combustion chamber and an outlet passageway communicating with said flue, a partition wall disposed in said settling chamber, said partition wall having a plurality of cylindrical chambers disposed along the width thereof, said chambers each having an inlet opening communicating with a portion of the settling chamber communicating with the combustion chamber and an axially spaced outlet communicating with a portion of the settling chamber communicating with said flue and means for injecting a fluid axially through said chambers whereby combustion gases laden with entrained solid particles emanating from said combustion chamber and introduced into said settling chamber, will traverse through said cylindrical chambers and said entrained solid particles will contact said fluid injected into said cylindrical chambers and separate from the mainstream of combustion gases.

2. An incinerator according to claim 1, wherein the inlet opening of each cylindrical chamber is offset relative to the vertical axis of the chamber to permit combustion gases to enter the chamber tangentially.

3. An incinerator according to claim 1, wherein the outlet of each cylindrical chamber is offset relative to the vertical axis of the chamber thereby ejecting gases traversing the chamber tangentially.

4. An incinerator according to claim 1, wherein the lower portion of said settling chamber comprises a fluid trough and said partition wall terminates at its lower end below the surface of fluid in said trough.

5. An incinerator according to claim 1, wherein said means for injecting a fluid into said cylindrical chambers comprises a spray unit mounted at the upper end of each cylindrical chamber for injecting a spray of fluid downwardly into the cylindrical chamber.

6. An incinerator according to claim 1, wherein the outlet of each cylindrical chamber is provided at the lower end thereof and is spaced from a lower wall of said settling chamber, and including partition means disposed in said settling chamber between the outlet ends of said cylindrical chambers and the portion of said settling chamber communicating with said combustion chamber.

7. An incinerator according to claim 6, wherein the inlet of each cylindrical chamber is offset relative to the axis thereof to permit combustion gases to enter the chamber tangentially.

8. An incinerator according to claim 6, wherein said means for injecting fluid into said chambers comprises a spray unit mounted at the upper end of each cylindrical chamber for injecting a spray of fluid downwardly into said chamber.

9. An incinerator comprising a housing structure including a combustion chamber, a settling chamber, a first passageway intercommunicating said combustion and said settling chamber, a plurality of cylindrical chambers each having axially spaced inlet and outlet openings, a second passageway intercommunicating said settling chamber and the inlets of said cylindrical chambers, a flue, and a third passageway intercommunicating the outlets of said cylindrical chambers and said flue and means for injecting a fluid axially through said chambers whereby combustion gases laden with entrained solid particles emanating from said combustion chamber and flowing through said first passageway, said settling chamber and said second passageway, will traverse through said cylindrical chambers and said entrained solid particles will contact said fluid injected into said cylindrical chambers and separate from the mainstream of combustion gases.

10. An incinerator according to claim 9, wherein the inlet opening of each cylindrical chamber is offset relative to the vertical axis of the chamber to permit the combustion gases to enter the cylindrical chamber tangentially.

11. An incinerator according to claim 9, wherein the outlet opening of each cylindrical chamber is offset relative to the vertical axis of the chamber thereby ejecting gases traversing the cylindrical chamber tangentially.

12. An incinerator according to claim 9, wherein the lower portion of said third passageway comprises a fluid trough and said cylindrical chambers terminate at their lower ends below the surface of fluid in said trough.

13. An incinerator according to claim 9, wherein said means for injecting a fluid into said cylindrical chambers comprises a spray unit mounted at the upper end of each cylindrical chamber for injecting a spray of fluid downwardly into the cylindrical chamber.

14. An incinerator according to claim 9, wherein the outlet of each cylindrical chamber is provided at the lower end thereof and is spaced from a lower wall of said third passage means.

15. An incinerator according to claim 14, wherein the inlet of each cylindrical chamber is offset relative to the axis thereof to permit combustion gases to enter the chamber tangentially.

16. An incinerator according to claim 14, wherein said means for injecting fluid into said chambers comprises a spray unit mounted at the upper end of each cylindrical chamber for injecting a spray of fluid downwardly into said chamber.

17. An incinerator according to claim 9, wherein said first and second passageways are disposed relative to each other whereby combustion gases passing through said settling chamber describe a curved path about a center of curvature disposed between said passageways, and said outlet passageway is provided with an inlet disposed sufficiently adjacent said center of curvature whereby said solid particles of said combustion gases passing through said settling chamber migrate along involute paths under the influence of centrifugal forces resulting from the motion of said combustion gases, impinging upon a wall of said settling chamber.

18. An incinerator according to claim 17, wherein those portions of said first and second passageways communicating with said settling chamber are vertically disposed.

19. An incinerator according to claim 17, including a baffle member disposed in said second passageway providing a restricted passageway disposed adjacent said center of curvature.

20. An incinerator according to claim 19, wherein said first and second passageways are vertically disposed.

21. In an incinerator having a combustion chamber and a flue, a structure for separating solid particles from combustion gases emanating from said combustion chamber comprising a plurality of vertical cylindrical chambers each having an inlet communicable with said combustion chamber and an axially spaced outlet communicable with said flue, and means disposed at the upper ends of said chambers for injecting a fluid axially through said chambers whereby combustion gases laden with entrained solid particles will traverse through said cylindrical chambers and said entrained solid particles will contact said fluid injected into said cylindrical chambers and separate from the mainstream of said combustion gases.

22. In an incinerator having a combustion chamber and a flue, a structure according to claim 21, wherein the inlet opening of each cylindrical chamber is offset relative to the vertical axis of the chamber to permit the combustion gases to enter the cylindrical chamber tangentially.

23. In an incinerator having a combustion chamber and a flue, a structure according to claim 21, wherein the outlet opening of each cylindrical chamber is offset relative to the vertical axis of the chamber thereby ejecting gases traversing the cylindrical chamber tangentially.

24. In an incinerator having a combustion chamber and a flue, a structure for separating solid particles from combustion gases emanating from said combustion chamber comprising at least two space partition walls disposed between said combustion chamber and said flue, each of said partition walls including a plurality of cylindrical chambers each having an inlet on one side thereof and an axially spaced outlet on the opposite side thereof, the outlets of one of said plurality of said cylindrical chambers communicating with the inlets of the other of said plurality of cylindrical chambers, to provide a continuous passageway for gaseous products of combustion emanating from said combustion chamber through said cylindrical chambers, to said flue, and means for injecting a fluid axially through said chambers whereby combustion gases laden with entrained solid particles traversing through said cylindrical chambers will contact said fluid injected said cylindrical chambers and separate from the mainstream of combustion gases.

25. In an incinerator having a combustion chamber and flue, a structure according to claim 24, wherein the inlet opening of each cylindrical chamber is offset relative to the vertical axis of the chamber to permit the combustion gases to enter the cylindrical chamber tangentially.

26. In an incinerator having a combustion chamber and a flue, a structure according to claim 24, wherein the outlet opening of each cylindrical chamber is offset relative to the vertical axis of the chamber thereby ejecting gases traversing the cylindrical chamber tangentially.

27. In an incinerator having a combustion chamber and a flue, a structure according to claim 24, wherein the outlet opening of each cylindrical chamber is disposed at the lower end thereof to eject gases traversing the cylindrical chamber axially.

28. In an incinerator having a combustion chamber and a flue, a structure according to claim 24, wherein the inlet opening of each cylindrical chamber is offset relative to the vertical axis of the chamber to permit the combustion gases to enter the cylindrical chamber tangentially, the outlet openings of the cylindrical chambers of one partition wall are offset relative to the vertical axes of the cylindrical chambers thereby ejecting gases traversing the cylindrical chambers tangentially, and the outlet openings of the cylindrical chambers of the next successive partition wall are disposed at the lower ends thereof thereby ejecting gases traversing the cylindrical chambers axially.